US006252962B1

(12) United States Patent
Sagey

(10) Patent No.: US 6,252,962 B1

(45) Date of Patent: Jun. 26, 2001

(54) FEATURELESS COVERT COMMUNICATION SYSTEM

(75) Inventor: William E. Sagey, Orange, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 08/392,336

(22) Filed: Feb. 2, 1995

Related U.S. Application Data

(63) Continuation-in-part of application No. 08/241,365, filed on Apr. 22, 1994, now abandoned.

(51) Int. Cl.[7] .............................. H04L 9/00; H03B 29/00; G06F 1/02

(52) U.S. Cl. ...................................... 380/48; 380/6; 380/9; 380/46; 364/717.01; 331/78

(58) Field of Search .................................. 380/6, 8, 9, 34, 380/43, 46, 48, 49; 331/78; 364/717, 717.01–717.07; 375/200–210

(56) References Cited

U.S. PATENT DOCUMENTS 5,007,087 * 4/1991 Bernstein et al. ...................... 380/46
5,048,086 * 9/1991 Bianco et al. ........................ 380/9 X
5,245,660 * 9/1993 Pecora et al. ........................... 380/48
5,291,555 * 3/1994 Cuomo et al. ............................ 380/6

* cited by examiner

*Primary Examiner*—Bernarr E. Gregory
(74) *Attorney, Agent, or Firm*—Leonard A. Alkov; William C. Schubert; Glenn H. Lenzen, Jr.

(57) ABSTRACT

A system and method of providing featureless covert communication is described. After synchronization is achieved between a covert transmitter and a covert receiver using two channels, one of which is a transmitted reference signal, a single channel is used to transmit the bulk of the communication message. The featureless covert communication system uses a digitally controlled noise source (capable of reproducing a pre-selected pseudo-random signal indistinguishable from ambient noise) at both transmitter and receiver. The digitally controlled noise source produces an uncorrupted reference signal at both locations. Since only once channel is used to transmit the message, 3 dB in power is saved. And, since the same reference signal is being generated locally at the receiver, corruption of the reference signal is eliminated, which improves the efficiency of the system by at least another 10 dB. The featureless covert communication system operates with signals that fall below the ambient noise levels and thus, even if intercepted, these signals should be confused with the normal occurrences of noise bursts in environment. Transmission of the two channel reference subsystem is limited to a very short duration which further minimizes interceptability of the system. To further complicate interception during the initial synchronization period, a controlled time delay may be inserted in one channel of the transmitter and a compensating time delay inserted in the other channel of the receiver.

12 Claims, 2 Drawing Sheets

FEATURELESS COVERT COMMUNICATION SYSTEM

This application is a continuation-in-part application of Ser. No. 08/241,365 filed Apr. 22, 1994, now abandoned.

BACKGROUND

This invention relates to covert communication systems, i.e., a communication system in which the transmitted waveform exhibits no man-made detection features.

Many military operations involve platforms that wish to communicate without disclosing their presence. Covert communication systems, systems which deny the enemy even the fact that a communication system is in use by friendly units, have been designed using direct sequence pseudo-random noise (DSPN) modulation techniques. Systems employing DSPN modulation techniques produce signals which sound like noise in conventional narrow band receivers. However, if the intercept receiver is situated relatively close to the transmitter, DSPN modulation techniques do not prevent a clean reception of the wideband signal. In this situation an intercept receiver may employ feature detectors to extract tell-tale parameters of the signal, such as spectral shape, identifiable amplitude characteristics or suppressed carrier frequency, which identify it as a man-made signal, defeating the covert communication system.

Another covert communication technique is the use of a transmitted noise reference system. Under the transmitted noise reference system, two channels are broadcast: a reference noise channel and a data channel.

The two transmitted signals sound and look like noise and are correlated at the receiver to extract the data or message signal. In order to achieve covert communication, the reference noise channel must be operated at levels below ambient noise. Because the receiver must work with a reference signal that has been corrupted by external noise, operating at these levels results in degraded performance. Under these conditions, signal processing time increases dramatically.

It is therefore an object of the invention to provide a covert communication system which transmits data and/or voice communications where the transmitted waveform exhibits no man-made detection features.

It is another object of the present invention to provide a covert communication system where the signal may be reduced to much lower levels below the ambient noise levels than in prior systems.

It is also an object of the present invention to defeat all feature detections while minimizing the time it takes for the intended receiver to acquire the signal.

SUMMARY OF THE INVENTION

To achieve the foregoing and other objects, in the featureless covert communications system and method according to the invention, synchronization is first achieved between a covert transmitter and a covert receiver using two channels, one of which is a transmitted reference signal, then a single channel is used to transmit the bulk of the communication message. The single channel uses a digitally controlled noise source at both the transmitter and the receiver. The digitally controlled noise source produces a signal having pre-selected and reproducible amplitude, frequency and phase components, which exhibit random noise like properties at both locations. Since only one channel is used to transmit the message, 3dB in power is saved. And, since the same reference signal is being generated locally at the receiver, the efficiency of the system is improved by at least another 10 dB, and corruption of the reference signal is eliminated. The featureless covert communication system operates with signals that fall below the ambient noise levels and thus, even if intercepted, these signals should be confused with the normal occurrences of noise bursts in environment. To further minimize interceptability of the system, transmission of the two channel reference subsystem is limited to short durations, typically less than one (1) second.

To further limit interceptability of the synchronization signal, additional features may be added. A time delay can be inserted into one channel at the transmitter and into the second channel at the receiver. Other features such as encryption devices that are synchronized from a global positioning satellite system, can also be added to further enhance the system.

DESCRIPTION OF THE INVENTION

Figure 1A:
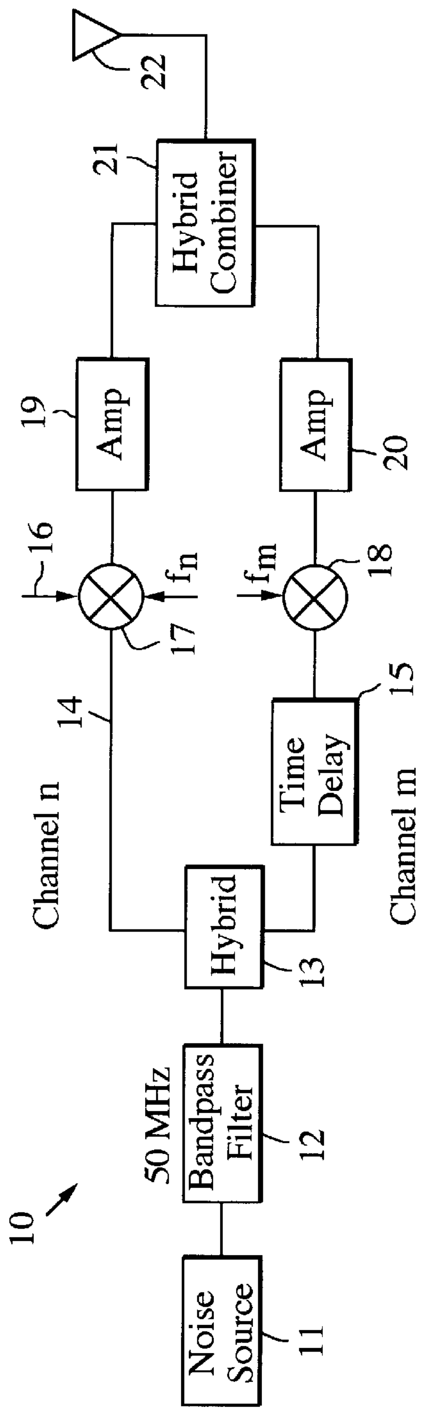
FIG. 1 shows the transmitter and receiver of the transmitted reference signal portion of a featureless covert communication system according to the invention.

The objectives of covert communication are generally achieved by first generating signals which fall below the ambient noise level in the intercept receiver, and second if, by chance, the intercept receiver is able to receive a clean signal, providing an "intercepted" signal that should be confused with the normal occurrences of noise bursts in the environment.

Spread spectrum communication systems generate wideband signals which fall below the ambient noise levels in most receivers. In spread spectrum communications, a transmission bandwidth is employed which is much greater than the bandwidth of the information to be communicated. The ratio of the transmission bandwidth to the information bandwidth is known as the processing gain. The objective in spread spectrum communication design is to develop processing gains that are extremely large without suffering the exponential increase in implementation complexities of higher and higher digital pseudorandom code rates in spread spectrum systems. Also, the depth with which the information signal may be buried below the noise level and still be recovered at the friendly receiver will be increased dramatically.

Mimicking the normal occurrences of noise bursts in the environment is achieved by using a transmitted waveform that is noise-like in all three characteristics: amplitude, frequency and phase, thus defeating feature detectors. A transmitted waveform having three noise-like components is achieved with a digitally controlled noise generator. A digitally controlled noise generator (DCNG) uses a complex combination of noise generators, incorporating pre-selected amplitude, frequency and phase components, to give a precise and reproducible waveform. The DCNG produces a signal which is not pure "random" noise as are produced by noise diodes. The noise produced by the DCNG can be reproduced and controlled within nanosecond accuracies.

Examples of digitally controlled noise generators which may be used in the featureless covert communication system include a noise generator using Chaos theory as disclosed U.S. Pat. No. 5,048,086 entitled "Encryption System Based on Chaos Theory", by M. Bianco et al. and U.S. Pat. No. 5,291,555 entitled "Communications Using Synchronized Chaotic Systems" by K. M. Cuomo et al.

In the featureless covert communication system of the invention, a transmitter (at a first location) is first synchronized with a receiver (at a second location) using the transmitted reference signal subsystem. In this subsystem, the synchronization signal is encoded on one noise channel. The encoded noise channel and a noise reference signal are then transmitted. Both signals are detected at the receiver and correlated to determine the synchronization signal. The synchronization signal (or preamble) will identify the time at which the data or message signal will be sent. The synchronization signal may also include other information, such as the data symbol period, a "barker" type code to establish a data start time, a receiver address and the data rate of the message.

Once the receiver synchronizes to the transmitted signal with coarse resolution, the major time uncertainty of the transmission path between moving terminals is resolved. Then the data signal is transmitted using only a single channel. Since now only a single channel is being used, transmission power requirements are reduced on the order of three decibels. Thus, an intercept receiver of the radiometer type has less signal energy to detect.

The data signal is encoded on the reference signal produced by a digitally controlled noise generator. The DCNG produces a reference signal having pre-selected and reproducible amplitude, frequency and phase components which exhibit random noiselike properties. The transmitter transmits the data encoded reference signal which is detected at the receiver. The receiver includes a DCNG which generates locally the same reference signal as the transmitter. The detected signal and locally generated reference signal are synchronized to the high resolution (nanosecond) state, through, for example, a slowing of the timing of the receiver DCNG, then correlated and demodulated to extract the data signal.

To further enhance the system, the synchronization signal is transmitted only for a very short duration, preferably less than one (1) second. Also, since the reference signal produced by the DCNG at the receiver is a "clean" signal, an additional ten decibels in performance can be achieved at the friendly receiver.

Figure 1B:
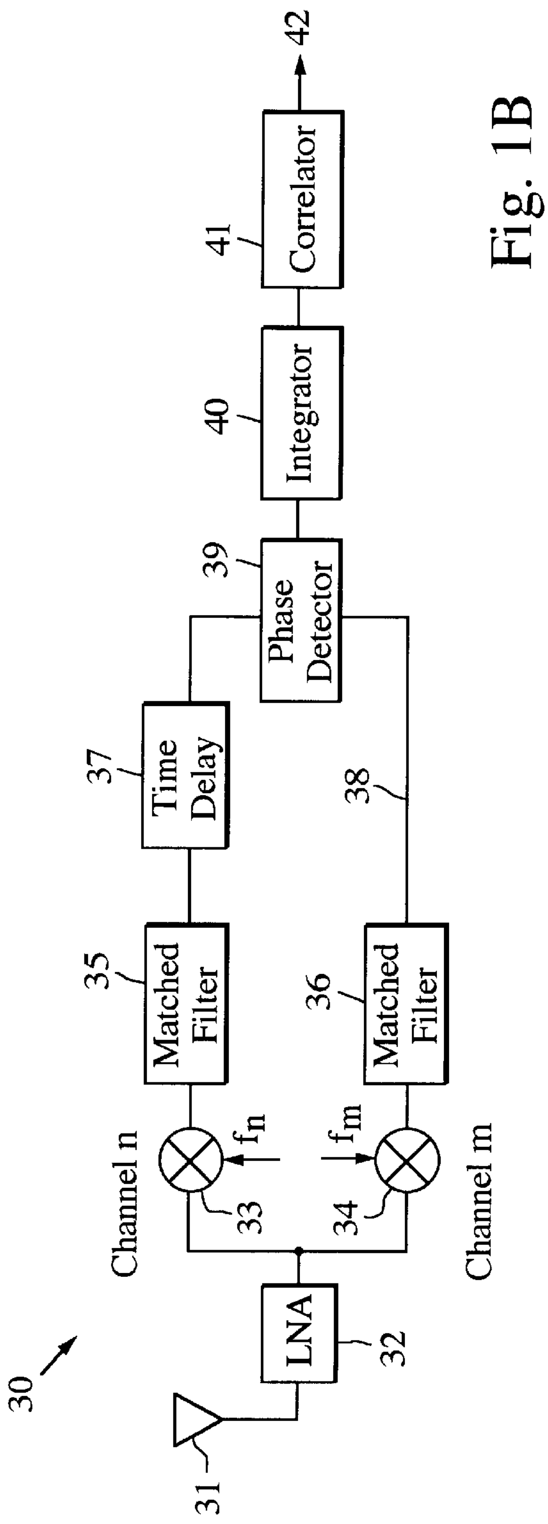

FIG. 1 shows the transmitter and receiver of the transmitted reference signal subsystem. In FIG. 1 transmitter 10 includes noise source 11 which generates a very wide bandwidth noise signal. This signal is filtered through bandpass filter 12 to make the signal more manageable. The noise signal then is split in hybrid 13 into two channels, channel n and channel m. Channel n is then modulated in modulator 17 by synchronization signal 16. Channels n and m are then amplified in amplifiers 19 and 20, respectively before they are combined in hybrid combiner 21. The combined signals are then transmitted via antenna 22.

The transmitted signals are received by antenna 31 of receiver 30. The received signals are amplified in low noise amplifier 32 before they are split into channels n and m. The received signals from mixer 33 and mixer 34 are filtered through matched filters 35 and 36, respectively to eliminate extraneous noise outside the signal passband. The outputs are then combined in phase detector 39, integrated in integrator 40 and correlated in correlator 41 to yield the synchronization signal 42.

The purpose of the synchronization subsystem is to achieve synchronization between transmitter and receiver so that the lengthy data message can then be communicated. Once synchronization is achieved, the data message can be sent. To limit power requirements, only one channel is used.

Figure 2A:
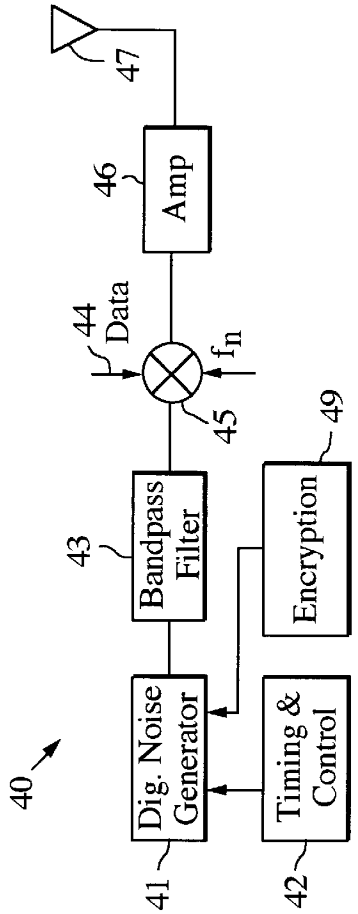
FIG. 2 shows the transmitter and receiver of the message portion of a featureless covert communication system according to the invention.
Figure 2B:
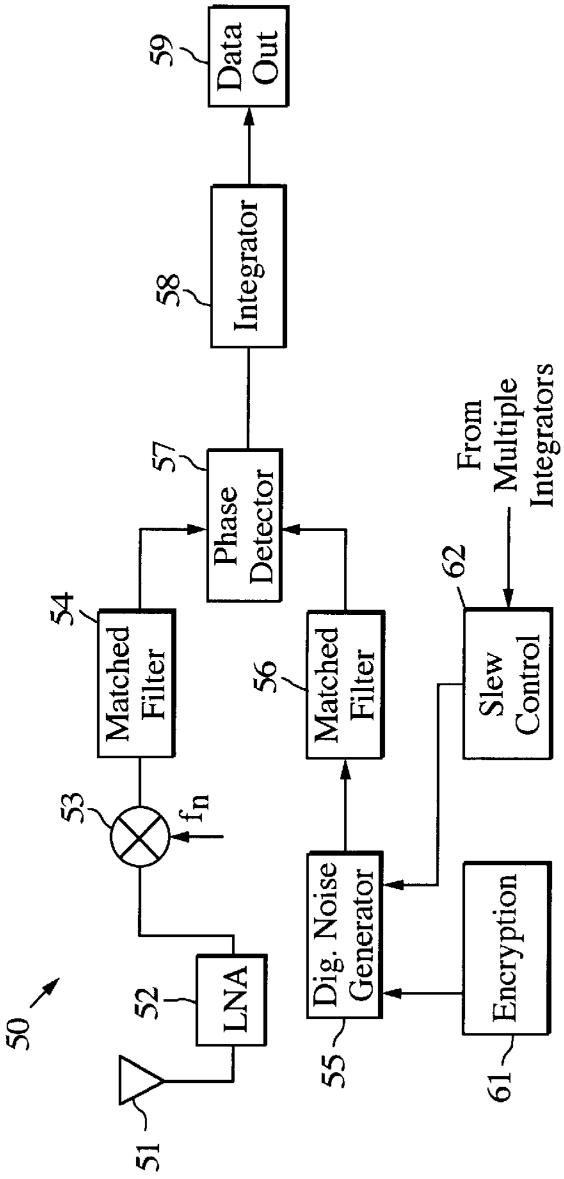

Referring to FIG. 2, transmitter 40 includes digitally controlled noise generator 41 to generate a reference signal having pre-selected and reproducible amplitude, frequency and phase components. The resulting precise waveform exhibits random noiselike properties. The reference signal from DCNG 41 is then filtered through bandpass filter 43 before it is modulated by data signal 44 in modulator 45. The modulated reference signal is then amplified in low band amplifier 46 before it is transmitted in antenna 47.

Receiver 50 detects the signal from transmitter 40 in antenna 51. The detected signal is amplified in amplifier 52 before it is converted in frequency in mixer 53 and filtered in matched filter 54. Receiver 50 also includes digitally controlled noise generator 55 which locally generates the same precise reference signal as transmitted by transmitter 40. The locally generated reference signal from DCNG 55 is filtered in matched filter 56. Then the detected signal and the locally generated reference signal are correlated in multiple phase detectors 57 and multiple integrators 58 to extract the data signal 59. High resolution (nonsecond) syncronization is achieved through slowing control 62. This slowing process can be completed, for example, through an exhaustive search of the order of 200 times states.

Prior art systems used the transmitted reference subsystem to transmit the lengthy data signal. The processing gain for such a system using 50 megahertz filters and a data channel (voice) of 2.4 kilohertz, would have a processing gain of approximately 43 decibels.

In the instant example, using the transmitted reference subsystem to transmit a synchronization signal in less than 100 milliseconds, assume that the signal-to-ambient noise level at the friendly receiver is −17 decibels. When both the information/data signal and the reference signal are At buried below the ambient noise level, a friendly receiver will a use 2 decibels of processing gain to improve the output signal-to-noise ratio by 1 decibel. Therefore, 2×17 decibels is 34 decibels, less 43 decibels leaves 9 decibels for signal recognition.

By using a single reference channel in the system to transmit the bulk of the data signal, all of the 17 decibel penalty is saved by using a "a clean" reference signal locally generated at the receiver.

The invention has been described as if there are two separate transmitter/receiver pairs and two different types of noise sources. Preferably, noise source 11 and DCNG 41 are the same digitally controlled noise generator in the transmitter (with appropriate switches to disconnect the second channel during data transmission). Similarly, a single receiver would include the digitally controlled noise generator 55 and switches to suitably connect it during data signal reception.

Covert communications can be further improved with the use of the following techniques. For example, channels A and B need not be transmitted side-by-side. Both transmitter and receiver can be designed to transmit and receive among several channels; i.e., to transmit and receive in two channels of a set of n equally likely channels psuedorandomly selected by a crypto device which is timed with GPS receivers. Thus an intercept receiver would have to search over a frequency space of n (where $n \geqq 2$) times W megahertz. For example, if one gigahertz of spectrum is available such that n=20, an additional processing gain of 13 decibels would be required at the intercept receiver, making a total of 56 decibels. This feature is noted by the designation of channels n and m in FIG. 1.

To further complicate the task of the intercept receiver, an additional crypto controlled psuedorandom variable parameter may be introduced. Referring to FIG. 1, a controlled time delay 15 is inserted in channel n of transmitter 10. Similarly, receiver 30 would insert a compensating time delay 37 in its channel n to bring both channels into time alignment and then processing can take place. Use of the time delay impedes the intercept receiver from performing its cross-correlation detections on a trial and error basis. It should be noted that both channels used in the synchronization signal will experience similar doppler shifts due to platform movement. A sophisticated receiver may initiate a doppler tracking system based on the processing of signals in the two channels, but for most applications it would not be required during the preamble acquisition of the message.

Once the preamble processing at the receiver has been completed, system performance is significantly improved by use of a DCNG, a locally generated noise source that is digitally controlled with precise timing. For purposes of the example system, the DCNG must accept digital presets to create unique starting points and have time accuracies of a few nanoseconds. The noise stream would preferably be the result of the interaction of a number of pseudorandom digital codes with special processing controlled by an encryption device.

As noted earlier, the transmitter may lower its output power (in the example, from 17 decibels to 3 decibels). For long messages, a resynchronization mechanism may be required, depending on the stability of the DCNGs. Thus, even though the duration of the data transmission is much greater than the preamble portion, it will not be detectable to an intercept receiver because of the vast difference in power levels.

It is also preferred that an encryption device set the parameters for the synchronization signal. Assuming the operating parameters (channel frequency and time delay) are set to change once an hour, these parameters are automatically selected based on the state of the encryption device at the terminal (for example, see encryption device 49 and 61 in FIG. 2). The state of the encryption device is, in time, based on the insertion of a local logical key and the time of day. Also, preferably, the time of day will be determined by a Global Positioning System (GPS) satellite, so that the "exact" time of operating parameter switch over may be determined. Timing and control 42 would receive a time signal from a GPS satellite. Time resolution accuracies of 100 nanoseconds are relatively easy to achieve. Therefore, during any hour of the day, the uncertainty period for transmitter (receiver) settings will be of the order of 100 nanoseconds plus the time of flight for the radio signal between transmitter and receiver.

After the transmitted reference preamble period of the message, encryption device 61 is used to establish the presets for DCNG 55 used during the data portion of the transmission. It should also be noted that frequency hopping techniques could be applied to the system.

Numerous other variations and alternate embodiments will occur to those skilled in the art without departing from the spirit and scope of the invention. Accordingly, it is intended that the invention be limited only in terms of the appended claims.

What is claimed is:

1. A method of communicating covertly between a transmitter and a receiver comprising the steps of:

generating first and second wideband noise channels;

generating a synchronization signal;

modulating said first channel by said synchronization signal to produce a modulated first channel;

transmitting said modulated first channel and said second channel;

receiving said transmitted modulated first channel and said transmitted second channel;

correlating said received first and second channels for determining said synchronization signal and synchronizing the transmitter and the receiver;

generating a data signal;

generating a digitally controlled noise reference signal at both the transmitter and the receiver, said digitally controlled noise reference signal having a pre-selected and reproducible amplitude, frequency and phase components, which exhibit random noiselike properties;

modulating said digitally controlled noise reference signal at the transmitter by said data signal to produce an information bearing signal;

transmitting said information bearing signal;

receiving said information bearing signal at the receiver;

correlating and demodulating said received information bearing signal and said locally generated digitally controlled noise reference signal at the receiver for extracting said data signal.

2. The method of claim 1 wherein said modulated first channel and said second channel are transmitted for a duration of less than one second.

3. The method of claim 2 wherein said synchronization signal includes a data start time.

4. The method of claim 2 wherein said synchronization signal includes the receiver identification, data symbol period and data rate information.

5. The method of claim 1 wherein said data signal includes encrypted data.

6. The method of claim 1 further comprising the step of:

adding a pre-selected time delay into said second channel while transmitting said modulated first channel and said second channel; and adding said pre-selected timeldelay into said received first channel prior to said correlation step.

7. A system for covert communication between a first location and a second location comprising:

a transmitter located at the first location, wherein the transmitter comprises:

means for generating first and second wideband noise channels;

a synchronization signal source;

a data signal source;

second means for generating a pre-selected digitally controlled noise reference signal, said reference signal having pre-selected and reproducible amplitude, frequency and phase components which exhibit random noise-like properties;

modulation means for modulating said first channel by said synchronization signal to produce a modulated first channel and for modulating said pre-selected digitally controlled noise reference signal by said data signal to produce a modulated reference signal;

first means for transmitting said modulated first channel and said second channel and for transmitting said modulated reference signal; and a receiver located at the second location, wherein the receiver comprises:

means for receiving said transmitted modulated first channel and said second channel and for receiving said transmitted modulated reference signal;

third means for generating said pre-selected digitally controlled noise reference signal;

correlation means for correlating said received first and second channels for determining said synchronization signal and for correlating and extracting said received modulated reference signal and said locally generated digitally controlled noise reference signal for determining and extracting said data signal.

8. The system of claim 7 wherein said synchronization signal includes a data start time.

9. The system of claim 7 wherein said synchronization signal includes the receiver address, data symbol period and data rate information.

10. The system of claim 7 wherein, in said transmitter, further comprising means for adding a pre-selected time delay into said second channel; and wherein, in said receiver, further comprising means for adding said pre-selected time delay into said pre-selected digitally controlled noise reference signal.

11. The system of claim 10 wherein said encryption means includes means for selecting said first and second channels and for selecting said time delay.

12. The system of claim 7 further comprising encryption means for encrypting said data signal.

* * * * *